(12) United States Patent  (10) Patent No.: US 9,372,384 B2
Hudson et al.  (45) Date of Patent: Jun. 21, 2016

(54) CAMERA QUICK ATTACHMENT AND RELEASE MECHANISM

(71) Applicants: Andrew John Hudson, Santa Rosa, CA (US); Caralin Riva Adair, Santa Rosa, CA (US)

(72) Inventors: Andrew John Hudson, Santa Rosa, CA (US); Caralin Riva Adair, Santa Rosa, CA (US)

( * ) Notice: Subject to any disclaimer, the term of this patent is extended or adjusted under 35 U.S.C. 154(b) by 0 days.

(21) Appl. No.: 14/723,191

(22) Filed: May 27, 2015

(65) Prior Publication Data

US 2015/0346588 A1    Dec. 3, 2015

Related U.S. Application Data

(60) Provisional application No. 62/004,179, filed on May 28, 2014.

(51) Int. Cl.
| | | |
|---|---|---|
| *A47B 96/06* | (2006.01) | |
| *A47K 1/00* | (2006.01) | |
| *G03B 17/56* | (2006.01) | |
| *F16M 13/02* | (2006.01) | |
| *F16B 2/14* | (2006.01) | |

(52) U.S. Cl.
CPC ............ *G03B 17/561* (2013.01); *F16B 2/14* (2013.01); *F16M 13/022* (2013.01); *G03B 17/566* (2013.01)

(58) Field of Classification Search
CPC ... F16M 13/00; F16M 2200/00; F16M 13/02; F16M 11/00; F16M 13/022; G03B 17/561
See application file for complete search history.

(56) References Cited

U.S. PATENT DOCUMENTS

| | | | |
|---|---|---|---|
| 6,698,942 B2 | 3/2004 | Ward | |
| 7,217,164 B2 | 5/2007 | Short | |
| 7,614,805 B2 * | 11/2009 | Showalter | F41G 11/004 396/428 |
| 8,132,764 B2 | 3/2012 | Kuipers | |
| 8,534,933 B2 | 9/2013 | Sherwood | |
| 8,857,775 B1 | 10/2014 | Clearman et al. | |
| 2005/0164541 A1* | 7/2005 | Joy | B60R 11/00 439/352 |
| 2012/0019661 A1 | 1/2012 | Thomson | |
| 2014/0105589 A1 | 4/2014 | Samuels | |
| 2014/0110179 A1 | 4/2014 | Lassoie | |

OTHER PUBLICATIONS

Cameragrip, "Hague SC1 Superclamp With Ball Leveller for Cameras." Internet. Available at http://www.cameragrip.com/hague-sc1-superclamp-with-ball-leveller/ Last visited May 5, 2015.
Gopro, Inc. "Handlebar / Seatpost / Pole Mount." Internet. Available at http://shop.gopro.com/mounts/handlebar-seatpost-pole-mount/GRH30.html. Last visited May 5, 2015.

* cited by examiner

*Primary Examiner* — Amy Sterling
(74) *Attorney, Agent, or Firm* — PatentBest; Andrew McAleavey

(57) ABSTRACT

A quick attachment and release mounting mechanism for a camera. The mechanism includes a clamping base with clamping structure adapted to be secured around an object, such as a paddle, and an adapter. The clamping base includes a receptacle which is trapezoidal and narrower at the top, and also tapers from one end to the other. The receptacle is disclosed forwardly of the clamping structure. The adapter includes a fastener adapted to engage a camera, and a leading portion with a shape that is complementary to that of the receptacle. A latch mechanism is provided to latch the adapter and receptacle together. The latch mechanism is shielded from accidental disengagement by a frame.

20 Claims, 5 Drawing Sheets

CAMERA QUICK ATTACHMENT AND RELEASE MECHANISM

CROSS-REFERENCE TO RELATED APPLICATIONS

This application claims priority to U.S. Provisional Patent Application No. 62/004,179, filed on May 28, 2014. That application is incorporated by reference herein in its entirety.

BACKGROUND OF THE INVENTION

1. Field of the Invention

In general, the invention relates to mounting mechanisms for cameras and video equipment, and more particularly, to mechanisms allowing for the quick attachment and release of cameras and video equipment.

2. Description of Related Art

As cameras have transitioned from film to digital, and as digital technology has improved, cameras have become smaller and lighter, as well as more robust. Their increased portability and robustness has led many people to take cameras where they might not have gone, or have been able to go, in the past.

Most cameras have a standard receptacle for attaching to a tripod, typically with ¼-20 or ⅜-16 UNC threads. A thumbscrew mounted to the tripod is threaded into the receptacle to secure the camera to the tripod.

While the typical thumbscrew-and-receptacle arrangement is almost universally used, it takes time and a measure of dexterity to secure the thumbscrew in the receptacle. Neither quality is always available. Additionally, while the typical arrangement may be effective in securing a camera to a traditional tripod, it often cannot be used to secure a camera to the full range of objects and surfaces where a user might wish a camera to be.

As cameras have become smaller, lighter, and more robust, a number of manufacturers have made cameras and mounts that are intended for "active" settings and outdoor applications. Among these, GoPro, Inc. (San Mateo, Calif., United States) is one of the more well-known manufacturers. GoPro, Inc. makes a camera mount with a quick release, in which one part is attached to the camera by means of a more traditional attachment mechanism, another part is attached to the surface or object to which the camera is to be mounted, and the two parts are quickly and easily attached and detached to complete the mounting of the camera. U.S. Patent Application Publication No. 2014/0105589 to Samuels describes this basic mechanism in the context of a vibration damper, and U.S. Pat. No. 8,857,775 to Clearman et al. illustrates the use of a very similar mechanism in a camera mount that mounts a camera to an object atop a flexible shaft. While this mechanism does provide for quick engagement and disengagement, the mechanism is not necessarily shielded and thus, accidental contact may release the camera. Additionally, it can be hard to grip the portions of the mechanism that must be pressed inwardly in order to release the camera.

SUMMARY OF THE INVENTION

One aspect of the invention relates to a quick attachment and release mounting mechanism for a camera. The quick attachment and release mechanism comprises two parts: a clamping base that is adapted to be secured to an object on which a camera is to be mounted, and a camera foot or adapter that is adapted to be connected to the camera itself.

The clamping base has attaching structure adapted to attach it to the object. In one embodiment, the attaching structure may be clamping structure adapted to be secured to or around the object. The clamping base also has a receptacle, and in some embodiments, the receptacle may be disposed forwardly of the clamping structure.

The adapter includes a leading portion adapted to be inserted into the receptacle of the clamping base, an attachment portion that includes a thumbscrew, or other appropriate fastening structure, adapted to secure the adapter to a receptacle of the camera, and a latch arm. The latch arm extends horizontally from a rigid frame at one end of the adapter and carries a depending projection that falls into a slot in the clamping base to secure the clamping base and the adapter together. At least an actuating portion of the latch arm is recessed or shielded by the frame.

The leading portion of the adapter may have a tapered trapezoidal shape that is wider at the base than the top and is narrower at the leading end than at the other end. The receptacle of the clamping base may have a complementary shape, such that the two components make a tapered dovetail connection when engaged. The clamping base may carry certain other features for convenience and security, including a loop to which the camera strap may be clipped.

These and other aspects, features, and advantages of the invention will be set forth in the description that follows.

BRIEF DESCRIPTION OF THE DRAWING FIGURES

The invention will be described with respect to the following drawing figures, in which like numerals represent like features throughout the figures, and in which.

DETAILED DESCRIPTION

Figure 1:
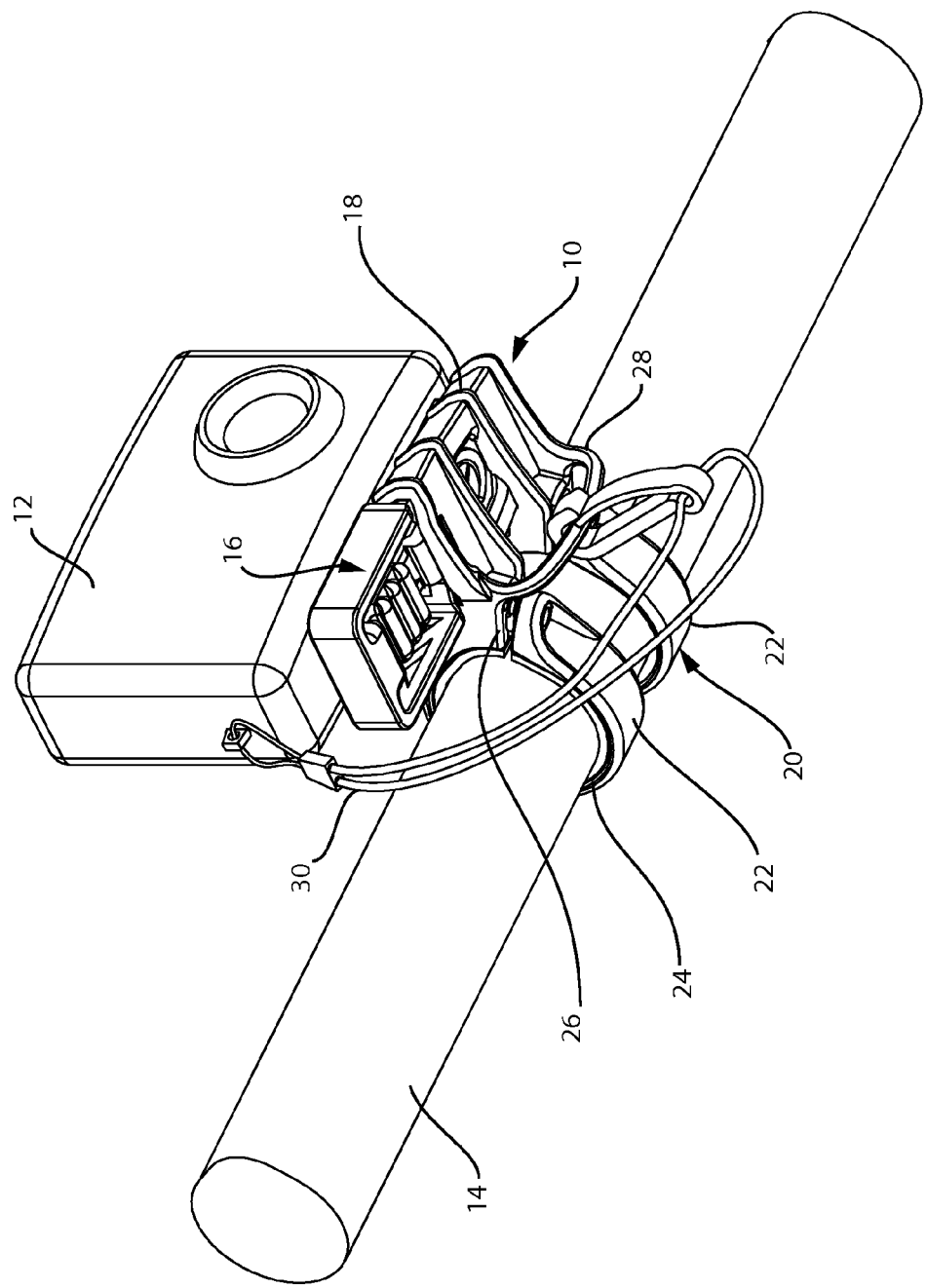
FIG. 1 is a perspective view of a camera attached to an object by a quick attachment and release mechanism according to an embodiment of the invention.

FIG. 1 is a perspective view of a quick attachment and release mounting mechanism, generally indicated at 10, shown mounting a camera 12 to an object 14. In the view of FIG. 1, the object 14 is a shaft with a slightly teardrop-shaped cross-section. In fact, the mounting mechanism 10 may be particularly suitable for attaching cameras 12 to paddles and oars, thus allowing a camera 12 to be easily used while kayaking, canoeing, rowing, paddle boarding, and performing other such activities. However, as will also be understood from the following description, the shape of the object 14 and its purpose are not critical, and in other embodiments of the invention, mounting mechanisms 10 may be made to attach to objects 14 of other shapes.

The mounting mechanism 10 has two complementary parts that engage one another to secure the camera 12 to the object 14: a camera foot or adapter 16 that is mounted to the camera 12 and a clamping base 18 that is attached to the object 14. As can be seen in the view of FIG. 1, the clamping base 18 includes a clamp 20 that encircles the object 14. In this embodiment, the clamp 20 comprises two curved, relatively thin members 22 spaced from one another, although in other embodiments, the clamp 20 may comprise a wide, continuous sleeve. However, the use of spaced, relatively thin members 22 in the clamp 20 saves both material and weight.

In some embodiments, the clamp may be a split ring (or a split shape of some other kind, depending on the nature of the object 14), with a hinge connecting two separate parts, so that the members 22 can be opened to be placed on and removed from the object 14. However, in the illustrated embodiment, the two members 22 do not have hinges and are instead made of a material of sufficient resilience that they can be pulled open to seat the clamp 20 and will return to their original shape and position. The inner surface of each of the members 22, the surface that faces the object 14, is lined with a non-slip material 24, typically a rubber, to increase friction between the clamp 20 and the object 14, and thus, to better retain the clamping base 18 on the object 14. Flanges 26 are provided at the open ends of each of the clamping members 22 and allow the clamping members 22 to be closed around the object 14. In a typical arrangement, for example, socket head cap screws would be secured in the flanges 26 to fix the clamping members 22 closed. Thus, the mounting of the clamping base 18 to the object 14 is releasable, but the clamping base 18 may remain on the object 14 for a long period of time.

As an additional safety measure, and for convenience, the clamping base 18 includes a loop 28, to which the camera strap 30 may be clipped, as shown. This allows the camera 12 direct connection to both the adapter 16 (as will be described below in more detail) and the clamping base 18. Thus, during use, if the adapter 16 and clamping base 18 were to come apart, or if the connection between the two components 16, 18 were to be damaged in some way, the camera 12 would not be lost as long as the loop 28 was still intact. Additionally, the loop 28 can be used for temporary securement. For example, as a safety measure, a user might first clip the camera strap 30 to the loop 28 before taking the camera 12 out of a pocket and then proceed to secure the camera 12 fully. This could be done whether or not the camera 12 is already connected to the adapter 16. In the illustrated embodiment, the loop 28 is a flattened, rigid loop molded of the same material of which the clamping base 18 itself is made, and is an integral part of the clamping base 18. However, in other embodiments, the loop 28 could comprise a loop of flexible wire rope or another suitable flexible material. A flexible loop 28 could be secured to the clamping base 18 by inserting it through suitable openings provided in the clamping base 18.

Figure 2:
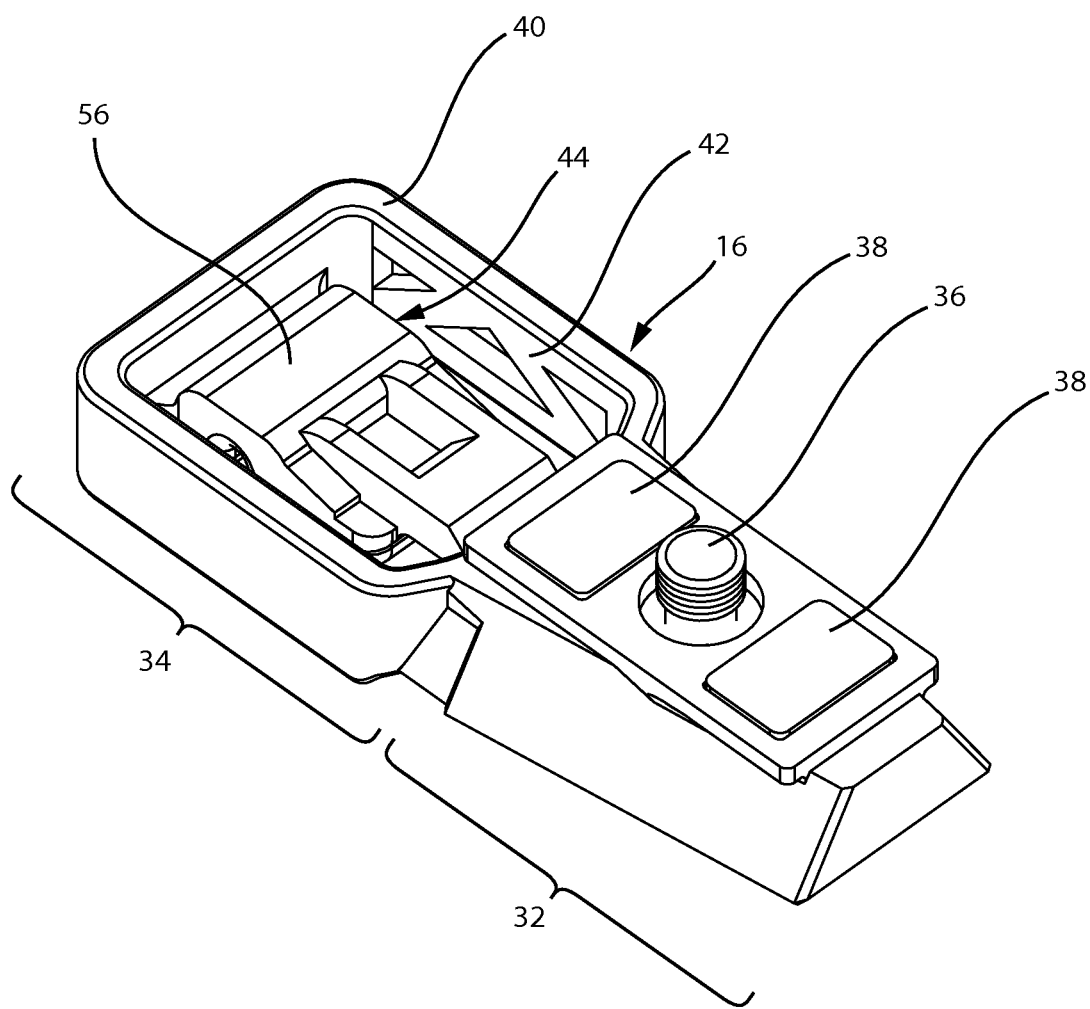
FIG. 2 is a top perspective view of the camera adapter portion of the quick attachment and release mechanism of FIG. 1.
Figure 3:
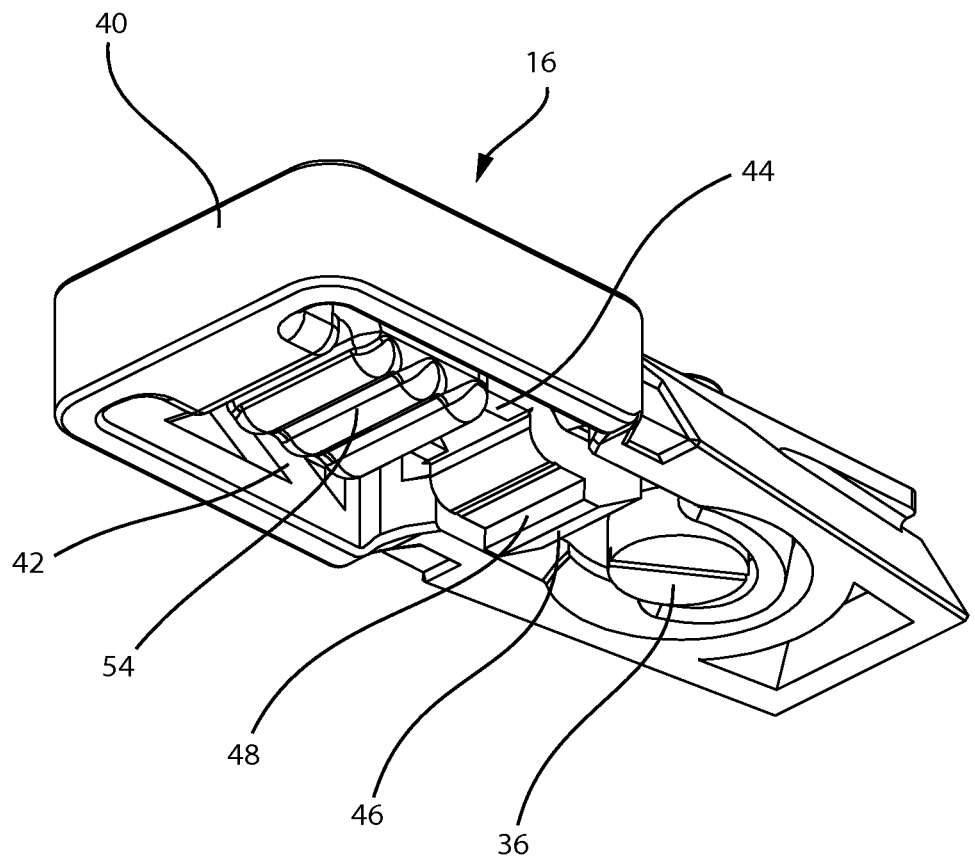
FIG. 3 is a bottom perspective view of the camera adapter portion.
Figure 4:
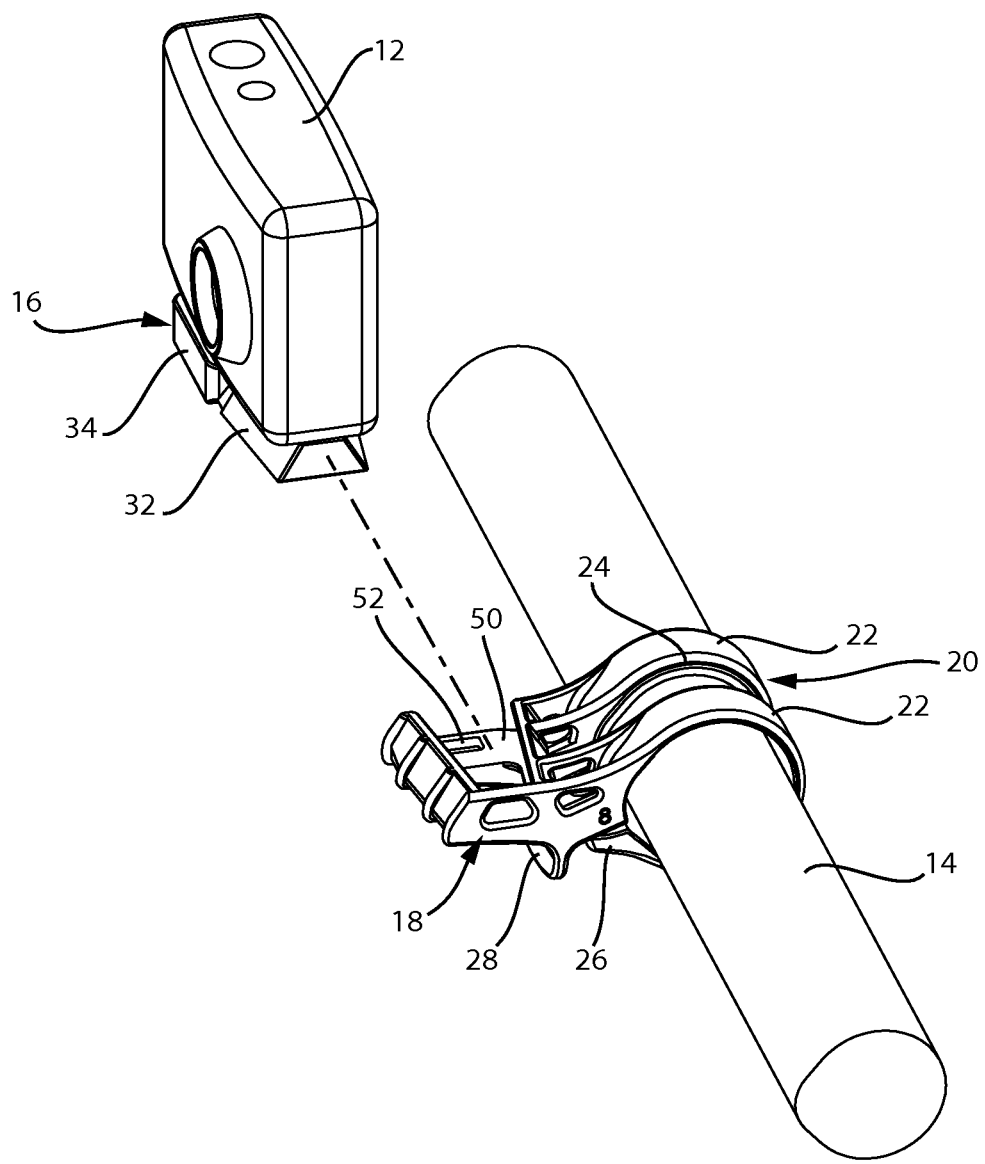
FIG. 4 is an exploded perspective view of the quick attachment and release mechanism of FIG. 1.
Figure 5:
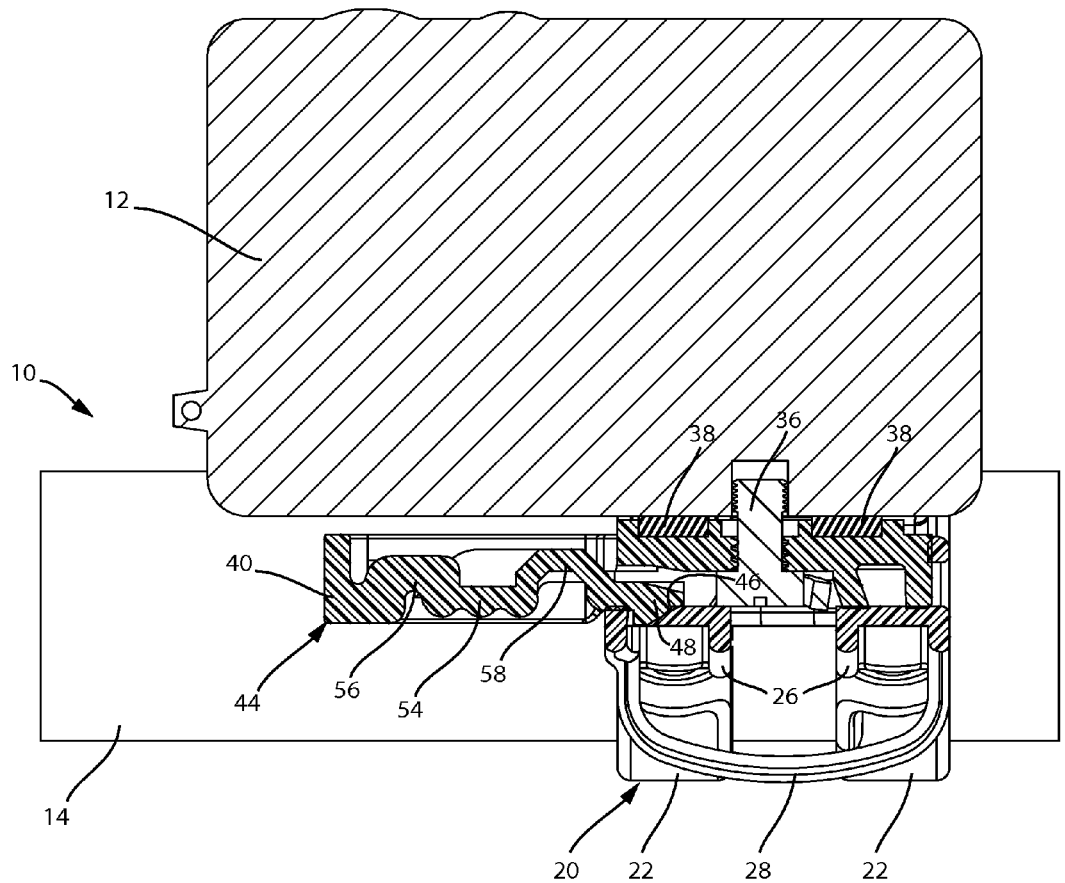
FIG. 5 is a cross-sectional view of the engaged quick attachment and release mechanism.

FIGS. 2 and 3 are top and bottom perspective views, respectively, of the adapter 16 in isolation. FIG. 4 is an exploded perspective view illustrating the manner of engagement of the adapter 16 and the clamping base 18, and FIG. 5 is a cross-section of the connected adapter 16 and clamping base 18. Collectively, these views illustrate the features of the two components 16, 18 and the manner of their complementary engagement.

Generally speaking, the adapter 16 has a leading portion 32 and a latching portion 34. The leading portion 32 includes a thumbscrew 36 adapted to engage the receptacle of the camera 12. (Although the term "thumbscrew" is used here, any kind of fastener may be used, and some fasteners, like sockethead machine screws, may be tool-driven.) The thumbscrew 36 is installed from the underside of the leading portion 32, so that fingers or a tool can be applied to it along the underside to tighten it. In the illustrated embodiment, the thumbscrew 36 is also "captured" in the adapter 16 so that it will not fall out. As shown in FIG. 2, pair of rubber pads 38 are installed on the upper surface of the leading portion 32 and flank the thumbscrew 36 to increase the friction between the camera 12 and the adapter 16 when the two are engaged.

The leading portion 32 has a tapered trapezoidal shape overall, such that it tapers trapezoidally from the bottom toward the top, and is also narrower at one end and wider the other. As can be seen in FIG. 3, the head of the thumbscrew 36 is accessible from the underside of the adapter 16, so that the camera 12 can be attached and detached.

The latching portion 34 comprises a rigid, generally rectangular frame 40, which may include integral reinforcing structures 42, such as thickened bars, in its sidewalls. Connected to the far wall of the frame 40 and extending toward the leading portion 32 in cantilevered fashion is a latch arm 44. At its far end, the latch arm 44 includes an angled cam surface 46 which defines one face of a depending, downwardly-facing projection 48.

The frame 40 shields the latch arm 44 and prevents the latch arm 44 from being jostled or otherwise subjected to unwanted movements. This, in turn, prevents the adapter 16 and clamping base 18 from being unexpectedly disengaged from one another while in use. Although it may be advantageous to include a frame 40 for these reasons, in other embodiments, it may be omitted.

When the leading portion 32 of the adapter 16 is slid into the complementary slot or compartment 50 of the clamping base 18, the two components 16, 18 are fixed vertically and horizontally by the tapered dovetail connection formed between the leading portion 32 and the compartment 50. They are retained in position by the latch arm 44.

More specifically, as the leading portion 32 moves toward its resting position within the compartment 50, the action of the bottom surface of the compartment 50 on the cam surface 46 of the latch arm 44 causes the latch arm 44 to deflect slightly upward and brings the bottom edge of the depending projection 48 above the bottom of the compartment 50. The latch arm 44 resiliently returns to its original position as the depending projection 48 falls into a socket 52 placed in its path. The engagement of the depending projection 48 in the socket 52 prevents the leading portion 32 from sliding out of the compartment 50 in the clamping base 18, thus securing the adapter 16 and the base 18. The fully engaged arrangement of the two components 16, 18 is shown in the view of FIG. 5.

The socket 52 may be considerably larger than the depending projection 48, as long as it provides a feature that secures the depending projection 48. The double-tapered shape of the leading portion 32 and the compartment 50, as well as the forward wall of the compartment, prevent the leading portion 32 from being pushed in any farther. Additionally, although linear tapers in height and width are shown in the illustrated embodiment, contours, keyed or slotted features, and other forms of interengaging features could be used in other embodiments of the invention.

In order to release the two components 16, 18, the user exerts upward force on a thumb pad 54 on the underside of the latch arm 44. The thumb pad 54 may include structures or a texture to make it easily identifiable by feel. In the illustrated embodiment, three depending, hemi-cylindrical projections provide the thumb pad 54 with an identifiable texture. In other embodiments, knurling and other forms of surface texturing may be used. Additionally, the material of the thumb pad 54 may be different than the material of the surrounding latch arm 44. For example, a rubber could be co-molded such that the surface of the thumb pad 54 is rubbery in texture. Pushing up on the latch arm 44 lifts the depending projection 48 out of the compartment 50, allowing the adapter 16 to be slid out of the clamping base 18.

The latch arm 44 is thus subjected to some degree of bending stresses during use. As can be seen most clearly in the view of FIG. 5, the shape of the latch arm 44 is serpentine as it extends from the frame 40 toward the leading portion 32, including a first serpentine portion 56 proximate to one end and a second serpentine portion 58 between the thumb pad 54 and the depending projection 48. The first serpentine portion 56, which acts as the major joint that sees bending stresses, is thickened relative to the rest of the latch arm 44. The serpentine cross section and thickened areas of the latch arm 44 help to reduce bending stresses. As those of skill in the art will appreciate, the closer the thumb pad 54 is to the depending projection 48, the more leverage the user will have when depressing the thumb pad 54 and the more easily the mechanism will release.

It should be understood that while the illustrated embodiment includes a single latch arm 44 that inserts into a single compartment 50 on the complementary part, embodiments of the invention may use latch mechanisms that include any number of parts. For example, it may be desirable to break the latch arm 44 into several parts or portions, either to reduce stresses on individual parts or to tailor the characteristics of the latching and unlatching action (i.e., to change the force with which a user is required to push on a button to disengage the components, to change the distance a user is required to move a button in order to disengage the components, etc.).

In the illustrated embodiment, the adapter 16 carries male engaging structure and the clamping base 18 carries female engaging structure. Of course, in other embodiments, the sense of that may be reversed, and the adapter may carry the female engaging structure.

In the above description, a single clamping base 18 is associated with a single adapter 16. However, in typical operation, a user might pre-install clamping bases 18 to several different objects where a camera 12 might be desired, e.g., several different paddles. A user might also pre-attach an adapter 16 to a camera 12. Thus, clamping bases 18 will be available for immediate installation of a camera 12 when the user desires it. Because the adapter 16 has a low profile and is lightweight, its presence on a camera 12 should not cause inconvenience or hinder performance. In some cases, the appropriate engaging structure for mating with an adapter 16 may simply be molded into or otherwise provided as an integral part of a paddle or other object 14. In that case, the clamping structure 20 of the base 18 would be unnecessary.

Additionally, while the clamping base 18 contains the female engaging structure and the adapter 16 contains the male engaging structure, this may be reversed in some embodiments. In those cases, the adapter would include a receptacle and the base would include a projecting portion.

As will be appreciated from FIGS. 1 and 4 in particular, the mounting mechanism 10 is arranged so that the camera 12 is mounted forwardly of the object 14, instead of directly on top of it. This accomplishes two things: (1) the center of gravity of the camera 12 is radially closer to the centerline of the object 14, which may decrease the tendency of the object 14 to roll when the camera 12 is installed; and (2) places the camera 12 shutter release in a more ergonomic position that is easier for a user to reach with his or her index finger while still gripping the object 14.

Clamping bases 18 and adapters 16 may be made of a variety of materials, including metals and plastics. If made of a metal, it may be helpful if the metal is resistant to corrosion or other properties of the environment in which it will be used. Suitable plastics include nylon, polyurethane, high-density polyethylene and polypropylene, to name a few.

While the invention has been described with respect to certain embodiments, the description is intended to be exemplary, rather than limiting. Modifications and changes may be made within the scope of the invention, which is defined by the claims.

What is claimed is:

1. A quick attachment and release mounting mechanism for a camera, comprising:
    a clamping base including
        clamping structure adapted to secure the clamping base to an object, and
        a receptacle having sidewalls that are tapered or contoured in a first way and a width that is tapered or contoured in a second way, and
        a first latching feature provided in the receptacle;
    a loop connected to the clamping base and adapted to receive and be connected to a camera strap; and
    a camera adapter including
        an adapter body with a leading portion that is contoured or tapered in ways complementary to the receptacle, such that the leading portion is adapted to be engaged within the receptacle,
        a fastener connected to the adapter body and adapted to connect the adapter body to a camera,
        a second latching feature provided in the camera adapter, the second latching feature being positioned and adapted to engage the first latching feature of the clamping base to engage the clamping base and the camera adapter, and
        a shield or frame provided around the second latching feature, the shield or frame preventing the second latching feature from being accidentally actuated.

2. The quick attachment and release mounting mechanism of claim 1, wherein the sidewalls of the receptacle are angled inwardly to give the receptacle a generally trapezoidal cross-sectional area.

3. The quick attachment and release mounting mechanism of claim 2, wherein the receptacle tapers in width horizontally from an opening thereof toward an end.

4. The quick attachment and release mounting mechanism of claim 3, wherein the leading portion has a generally trapezoidal cross-sectional area.

5. The quick attachment and release mounting mechanism of claim 4, wherein the leading portion increases in width from a front edge thereof to a rear portion thereof.

6. The quick attachment and release mounting mechanism of claim 1, wherein the first latching feature comprises a slot.

7. The quick attachment and release mounting mechanism of claim 6, wherein the second latching feature comprises a latching arm connected to an underside of the adapter body, the latching arm having a cam surface that causes the latch arm to deflect and drop into the slot as the leading portion of the adapter body is advanced into the receptacle.

8. The quick attachment and release mounting mechanism of claim 7, wherein the latching arm, or at least an actuating portion thereof, is recessed relative to the frame or shield.

9. The quick attachment and release mounting mechanism of claim 1, wherein the receptacle is disposed parallel to the clamping structure and is arranged such that an uppermost surface of the adapter body, when installed in the receptacle, lies vertically below an uppermost outer surface of the clamping structure and above a lowermost outer surface of the clamping structure.

10. The quick attachment and release mounting mechanism of claim 1, wherein the clamping structure comprises at least one split-ring clamp.

11. The quick attachment and release mounting mechanism of claim 1, wherein the loop is rigid and is an integral part of the clamping base.

12. The quick attachment and release mounting mechanism of claim 1, wherein the clamping base and the camera adapter are made of a plastic.

13. A quick attachment and release mounting mechanism for a camera, comprising:
 a clamping base including
  one or more split-ring clamps adapted to secure the clamping base to an object, and
  a receptacle having a slot or channel with a first shape and a first latching feature; and
 a camera adapter including
  an adapter body having a second shape complementary to the first shape of the receptacle so as to fit snugly within the receptacle,
  a fastener connected to the adapter body and adapted to connect the adapter body to a camera,
  a second latching feature provided in the camera adapter, the second latching feature being positioned and adapted to engage the first latching feature of the clamping base to engage the clamping base and the camera adapter;
 a disengagement mechanism coupled to one or both of the first or second latching features to disengage the first and second latching features; and
 a shield or frame provided around the disengagement mechanism to prevent the disengagement mechanism from being accidentally actuated;
 wherein the receptacle is spaced from the one or more split-ring clamps and is generally parallel to a long axis passing through the centers of the one or more split-ring clamps, the receptacle being arranged relative to the one or more split-ring clamps such that an uppermost surface of the adapter body, when installed in the receptacle, lies vertically below an uppermost circumferential outer surface of the one or more split-ring clamps and above a lowermost circumferential outer surface of the one or more split-ring clamps.

14. The quick attachment and release mounting mechanism of claim 13, wherein the first shape of the slot or channel is contoured or tapered in at least two distinct planes, and the second shape of the adapter body is contoured or tapered in a way complementary to the first shape.

15. The quick attachment and release mounting mechanism of claim 13, further comprising a loop connected to the clamping base and adapted to receive and be connected to a camera strap.

16. The quick attachment and release mounting mechanism of claim 13, wherein the first latching feature comprises a slot.

17. The quick attachment and release mounting mechanism of claim 16, wherein the second latching feature a latching arm connected to an underside of the adapter body, the latching arm having a cam surface that causes the latch arm to deflect and drop into the slot as the leading portion of the adapter body is advanced into the receptacle.

18. The quick attachment and release mounting mechanism of claim 17, wherein the disengagement mechanism comprises a thumb pad on a portion of the latching arm.

19. A quick attachment and release mounting mechanism for a camera, comprising:
 a clamping base including
  clamping structure adapted to secure the clamping base to an object, and
  a receptacle having sidewalls that are tapered or contoured in a first way and a width that is tapered or contoured in a second way, and
  a first latching feature provided in the receptacle; and
 a camera adapter including
  an adapter body with a leading portion that is contoured or tapered in ways complementary to the receptacle, such that the leading portion is adapted to be engaged within the receptacle,
  a fastener connected to the adapter body and adapted to connect the adapter body to a camera,
  a second latching feature provided in the camera adapter, the second latching feature being positioned and adapted to engage the first latching feature of the clamping base to engage the clamping base and the camera adapter, and
  a shield or frame provided around the second latching feature, the shield or frame preventing the second latching feature from being accidentally actuated;
 wherein the receptacle is disposed parallel to the clamping structure and is arranged such that an uppermost surface of the adapter body, when installed in the receptacle, lies vertically below an uppermost outer surface of the clamping structure and above a lowermost outer surface of the clamping structure.

20. The quick attachment and release mounting mechanism of claim 19, further comprising a loop connected to the clamping base and adapted to receive and be connected to a camera strap.

* * * * *